United States Patent [19]

Anselment et al.

[11] 4,055,503

[45] Oct. 25, 1977

[54] LUBRICATING POWDER AND METHOD OF PRODUCING SAME AND RELATIVELY SLIDEABLE COMPONENTS

[75] Inventors: Wolfgang Anselment, Stuttgart; Walter Gritschmeier, Waiblingen, both of Germany

[73] Assignee: Robert Bosch G.m.b.H., Stuttgart, Germany

[21] Appl. No.: 676,407

[22] Filed: Apr. 13, 1976

Related U.S. Application Data

[63] Continuation-in-part of Ser. No. 512,169, Oct. 4, 1974, abandoned.

[30] Foreign Application Priority Data

Oct. 11, 1973  Germany ............................ 2351044

[51] Int. Cl.$^2$ ..................... C10M 7/04; C10M 7/16
[52] U.S. Cl. .................................... 252/12; 252/12.2; 252/29
[58] Field of Search ..................... 252/12, 12.2, 29

[56] References Cited

U.S. PATENT DOCUMENTS

| | | | |
|---|---|---|---|
| 2,956,848 | 10/1960 | St. Clair | 252/12 |
| 3,321,287 | 5/1967 | Hunsberger | 51/295 |

FOREIGN PATENT DOCUMENTS

1,272,717  5/1972  United Kingdom

OTHER PUBLICATIONS

May et al., Epoxy Resins, Marcel Dekku Inc., N.Y., N.Y., 1973, p. 539.
Malevanskii et al., Chem. Abstracts, vol. 61, (1964), col. 8486.
Disapio, Product Engineering 9, 1960, pp. 48–53.

*Primary Examiner*—Arthur P. Demers
*Attorney, Agent, or Firm*—Flynn & Frishauf

[57] ABSTRACT

A coating powder for relatively slideable parts consisting essentially of a mixture of about 80%–60% graphite and about 20%–40% of an unhardened epoxide-containing epoxy resin/hardener mixture. The coating powder is made by admixing an epoxy resin and a hardener to a uniform mixture at an elevated temperature at which the epoxy resin does not react with the hardener while in the molten state. The unhardened epoxy resin/hardener mixture is then ground into coarse particles and admixed with coarse particles of graphite and the mixture ground to a fine powder. The invention also includes machinery having at least one self-lubricated surface coated with said powder which has been heated after application to the surface to form a cross-linked thermoset polymer binding said graphite.

5 Claims, No Drawings

LUBRICATING POWDER AND METHOD OF PRODUCING SAME AND RELATIVELY SLIDEABLE COMPONENTS

The present application is a Continuation-In-Part of application Ser. No. 512,169 filed on Oct. 4, 1974, now abandoned.

The present invention relates to blowers or ventilators of air pumps used in exhaust gas systems of internal combustion engines, and to a coating powder to improve the bearing capabilities of relatively slideable parts.

A suitable sliding or slipping material for rapidly relatively movable parts is particularly important in applications in which customary lubricants cannot be used. Fans, blower, or ventilators used in exhaust gas systems of internal combustion engines are subject to severe operating requirements which place particular emphasis on the ability of relatively movable parts to operate at high speed, freely, with respect to each other. Hydrocarbon-base lubricants cannot be used since the high temperatures of the exhaust gas would cause unburned hydrocarbon compounds derived from the hydrocarbon-base lubricants to enrich the exhaust gases.

It has previously been proposed to seal the suction from the supply side of the blower or ventilator by journalling the rotor of the blower on a ridge in the housing which has a layer applied thereto consisting of 70 to 90% molybdenum sulfide (by weight) with a thermoplastic binder. This coating or layer is usually applied by a plasma spray process.

Molybdenum sulfide is expensive, and in order to reduce the quantity of this expensive component in the layer, it has been proposed to make this layer from a mixture of from 50 to 70% molybdenum sulfide and graphite, with a binder, or inert material of from between 50 to 30% (by weight).

It is an object of the present invention to provide machinery which has relatively slideable surfaces coated with low-friction material; and further, to provide such a low-friction material, and a method of its application, which is relatively inexpensive.

SUBJECT MATTER OF THE PRESENT INVENTION

The coating powder is a mixture of graphite with an unhardened epoxy resin/hardener mixture which was formed in the molten state, and then solidified and comminuted. The coating powder contains 20 to 40% unhardened epoxy resin/hardener mixture and 80 to 60% graphite (all by weight). A combination of (i) unhardened epoxy resin/hardener mixture formed from 28.5 parts epoxy resin and 1.5 parts hardener, and (ii) 70 parts graphite (by weight) has been found particularly suitable.

The method to make this powder, in accordance with the invention, is characterized by these steps:
a. mixing of an epoxide-containing epoxy resin (hereinafter referred to as the "epoxide resin") and hardener;
b. mixing to attain a uniform mix (homogenizing) in the molten state;
c. breaking up of the cooled, unhardened epoxy resin/hardener mixture, i.e., the homogeneous mixture of the still unhardened epoxide resin and the hardener;
d. mixing of the coarse unhardened epoxy resin/hardener mixture pieces with coarse graphite pieces; and
e. grinding the mixture obtained in the foregoing step (d).

In order to prepare the machiner containing at least one self-lubricating surface of the present invention, it is necessary to first form a homogeneous mixture of the epoxide resin and the hardener. This homogenous mixture is formed by admixing the epoxide resin in the liquid state with the hardener and then permiting it to cool, followed by cominution into coarse particles. These coarse particles of the mixture are then in turn mixed with coarse graphite particles and the entire admixture finely ground to form a lubricating powder mixture containing (i) between about 80 and 60% of graphite and (ii) about 20 and 40% of said mixture of hardener and epoxide resin. The grain size of said lubricating powder containing said graphite and mixture of epoxide resin and hardener is ground, preferably to a maximum particle size of about 200 micrometers.

The epoxide resins used are preferably those belonging to the group of the aromatic epoxide resins, especially of the bisphenol A-type. They have an epoxide equivalent weight from 450 to 3,400 and melting points from about 60° to 160° C. In this temperature range the epoxy resin/hardener mixture is homogenized.

The homogeneous mixture of the epoxide resin and hardener is readily formed because the epoxide resins are those having melting points from about 60° to 160° C. The epoxide resins have an average molecular weight between about 900 and 3,800 and preferably between 1,200 and 1,600.

The epoxide resins are preferably resins of a generally linear type which contain epoxide groups, usually in the terminal or near-terminal positions. These epoxide resins are commonly formed by reacting an epoxide compound (often a di-epoxide or an epoxide compound containing one epoxide group and another reactive group) with a compound with two reactive OH-groups; for example, bisphenol A; to form the linear epoxide resin. The aforesaid preferred epoxide resins are prepared by reacting aromatic phenols, particularly, bisphenol A, with epoxide compounds, such as epichlorhydrine.

The hardeners are selected from the group of the reaction hardeners, especially acids, acid anhydrides or primary and secondary amines, or from the group of the catalytic hardeners, especially boron fluoride, boron fluoride amine complex or tertiary amines. As noted, the hardener utilized does not react when it is admixed with the molten epoxide resin to form the homogeneous mixture of the two. It does react with the epoxide resin when the final lubricating mixture is on the surface to which it is meant to become affixed. It is heated thereon at a temperature sufficiently high; for example, 200° C; to cause the hardener to react with the epoxide resin and form the cross-linked thermoset polymer which acts as a binder for the graphite particles. The preferred hardeners include dicyanodiamide, dicyanodiamide with an accelerator, pyromellitic-dianhydride.

The homogeneous mixture of the epoxide resin and hardener comprises between about 90 and 97 parts of the epoxide resin and between 3 and 10 parts of the hardener. The preferred proportion is between about 94 and 96 parts of the epoxide resin and between 4 and 6 parts of the hardener. All noted parts are by weight.

The epoxide resins and the hardeners are available materials and well known in the resin technology (see, for example, EPOXY RESINS CHEMISTRY AND TECHNOLOGY, by Clayton A. May and Yoshio Tanaka, New York, 1973).

As noted, after the hardener is mixed with the molten epoxide resin and a homogeneous mixture is formed, it is allowed to cool and is then broken up into coarse particles and the graphite admixed therewith. This graphite-containing mixture is then finally ground to form the lubricating powder of the present invention. The hardener and epoxide resin components of the lubricating powder react at temperatures between about 150° and 220° C, and preferably between about 180° and 210° C. For practical application and with the preferred mixture of hardener and epoxide resin, the hardener reacts with the epoxide resin at about 200° C to form a cross-linked polymer which is a thermoset resin and acts as the binder for the graphite particles. The lubricating powder is applied as a film on a substrate in a thickness of between about 100 and 180 micrometers, and preferably between about 110 and 130 micrometers. For ease of application, the lubricating powder is preferably sprayed on the surface which is being coated. The surface is preferably already heated to the temperature at which the hardener and epoxide resin react, e.g., 200° C, so that the lubricating powder is caused to react and cross-link when it contacts the hot surface. Alternate but presently less preferred methods of application of lubricating powder to the substrate surface include insertion of a heated substrate into a fluidized bed of the lubricating powder; another method of application involves spreading a thin layer of the lubricating powder on a cool substrate and then heating to the temperature at which the hardener reacts with the epoxide resins to form the cross-linked thermoset polymer.

The invention is further illustrated by the following Example:

EXAMPLE:

28.5 parts of epoxy (epoxide) resin of the type Epikote 1004 are mixed with 1.5 parts hardener of the type Epikure DX-108, both made by Shell International, the properties of which are available in data sheets of this firm, and homogenized in the molten state at 95° C. After the resin/hardener mixture has cooled, it is broken up to a grain size of about 2 mm, and mixed with 70% (by weight) of coarse graphite, having a grain size ranging up to 5 mm. Electro-graphite is suitable. This mixture is ground in a blast mill to a maximum size of about 200 micrometers.

In contrast to known coating powders of this type, the graphite is added to the unhardened epoxy resin/hardener mixture which was homogenized in the molten state, only after cooling of the homogenized unhardened epoxy resin/ hardener mixture, and is ground together with the unhardened epoxy resin/hardener mixture. The coating layer made of this powder is comparatively soft and is porous with good adhesion to a metal substrate or base, so that the coating has excellent sliding properties and, additionally, provides for good sealing. Dust particles and the like can be imbedded therein, so that they will not cause damage to other components of the equipment with which the powder is used.

The coating powder is particularly suitable to coat the inner parts of a blade-type pump, and particularly to a high-speed blade pump for use in the exhaust systems of internal combustion engines, as described, for example, in German Disclosure Document DT-OS 2,137,494. The coating powder can be applied to the ridge against which the rotor fits, and which is provided to seal the pump between the suction and the outlet side; it is also possible, and in some instances this permits easier application, to coat the entire outside surface of the rotor with the powder. The powder is applied by means of a blast spray device with compressed air through a nozzle, to provide for uniform dispersion. The rotor is heated to about 200° C, and rotates in front of the nozzle, spaced by about 55 mm therefrom. Impingement of the powder on the hot rotor component causes immediate melting of the powder and provides for a uniform coating thereon; the conditions of powder application are so selected that the thickness of the layer is between about 110 to 130 micrometers. The layer is then burned in (sintered) for 20 minutes in a 200° C furnace.

The coating powder in accordance with the present invention provides excellent sliding or bearing capability upon coating of relatively slidable parts. These excellent sliding or bearing characteristics are believed to be due to the particulars of the method of making the coating powder. Relatively slidable surfaces thus can be easily applied by the simple compressed air spray technique.

We claim:

1. A process of making a lubricant powder consisting essentially of a mixture of about 80% to 60% by weight of graphite and about 20% to 40% by weight of a mixture of a hardener and an unhardened epoxide resin comprising:
   a. mixing the hardener with molten unhardened epoxide resin at a temperature insufficient to react the hardener and epoxide resin, until a homogeneous mixture is formed;
   b. cooling said homogeneous mixture to form a solid homogeneous mixture of said hardener and unhardened epoxide resin;
   c. breaking up said cooled solid mixture;
   d. mixing said broken solid mixture with coarse graphite particles; and
   e. grinding said graphite-containing mixture into particles of a maximum size of 200 micrometers.

2. The process of claim 1 wherein said cooled mixture of hardener and unhardened epoxide resin are broken up to form particles of the size of about 2 mm; and wherein said graphite which is admixed therewith is of a particle size up to 5 mm.

3. A lubricant powder prepared in accordance with the process of claim 1, which is suitable for preparing a low-friction surface on a substrate, consisting essentially of a finely powdered mixture of between about 80 and 60% by weight of graphite, and about 20 and 40% of said homogeneous mixture of a hardener and an unhardened epoxide resin.

4. The lubricant powder of claim 3 having a maximum particle size of 200 micrometers.

5. The lubricant powder of claim 4 consisting of about 70% of graphite, 28.5 parts of epoxide resin, and 1.5 parts of hardener.

* * * * *